United States Patent
Onishi et al.

(10) Patent No.: US 6,502,428 B1
(45) Date of Patent: Jan. 7, 2003

(54) MANUFACTURING METHOD OF AN OPTICAL FIBER

(75) Inventors: Masashi Onishi, Yokohama (JP); Kazuya Kuwahara, Yokohama (JP); Katsuya Nagayama, Yokohama (JP)

(73) Assignee: Sumitomo Electric Industries, Ltd., Osaka (JP)

(*) Notice: Subject to any disclaimer, the term of this patent is extended or adjusted under 35 U.S.C. 154(b) by 267 days.

(21) Appl. No.: 09/698,280

(22) Filed: Oct. 30, 2000

(30) Foreign Application Priority Data

Nov. 1, 1999 (JP) .......................................... 11-311220

(51) Int. Cl.⁷ .............................................. C03B 37/07
(52) U.S. Cl. .............................. 65/378; 65/381; 65/382; 65/384
(58) Field of Search ...................... 65/378, 381, 382, 65/402, 435, 384

(56) References Cited

U.S. PATENT DOCUMENTS

| | | | |
|---|---|---|---|
| 4,021,217 A | * 5/1977 | Bondybey et al. | ..... 250/559.42 |
| 4,286,979 A | * 9/1981 | Buckler et al. | ............ 356/73.1 |
| 5,887,105 A | 3/1999 | Bhagavatula et al. | ....... 385/123 |
| 5,894,537 A | 4/1999 | Berkey et al. | .............. 385/123 |
| 6,044,191 A | 3/2000 | Berkey et al. | .............. 385/123 |

* cited by examiner

Primary Examiner—Sean Vincent
(74) Attorney, Agent, or Firm—McDermott, Will & Emery

(57) ABSTRACT

A manufacturing method of an optical fiber, which enables to precisely manufacture the optical fiber having a desired chromatic dispersion, comprising: (1) preparing an optical fiber preform having a longitudinally uniform refractive index, (2) measuring the chromatic dispersion of a predetermined length of the optical fiber obtained at the beginning of the drawing, (3) according to the results of such measurement, estimating the chromatic dispersion characteristic of the optical fiber obtained by drawing the optical fiber preform, and commencing the drawing of the optical fiber preform. To achieve the target chromatic dispersion diameter of the optical fiber is determined according to the chromatic dispersion that is measured with respect to a predetermined length of an optical fiber obtained at the beginning of the drawing of an optical fiber preform. Then, the remainder of the optical fiber preform is drawn to produce an optical fiber having the desired chromatic dispersion.

2 Claims, 5 Drawing Sheets

MANUFACTURING METHOD OF AN OPTICAL FIBER

BACKGROUND OF THE INVENTION

1. Field of the Invention

The present invention relates to a method of manufacturing an optical fiber, and more particularly to an optical fiber in which sections where the chromatic dispersion at a given wavelength is positive and sections where the chromatic dispersion is negative at a given wavelength are longitudinally alternately provided.

2. Related Background Arts

A wavelength division multiplexing (WDM) transmission system can effect high speed, high capacity optical communications by transmitting multiple wavelengths of optical signals in a single transmission line. Because the transmission loss of a silica optical fiber is small at the wavelength band of 1.55 µm, and optical amplifiers for amplifying optical signals at the wavelength band of 1.55 µm are available, optical signals of the 1.55 µm wavelength band are used in WDM transmission systems.

When there is chromatic dispersion at the optical signal band in an optical fiber transmission line used for a WDM transmission system, the pulse waveform of the optical signal is deformed and transmission quality deteriorates. Therefore, from this point of view, it is desirable that the chromatic dispersion value in the optical signal wavelength band is small. On the other hand, when the chromatic dispersion value in the optical signal wavelength band is substantially zero, the nonlinear optical effect of four-wave mixing tends to occur; thereby crosstalk and noise arise, and transmission quality deteriorates. In order to suppress the occurrence of four-wave mixing, the optical signal power might be reduced but such an optical transmission system would require the repeater spans to be shorter such that more optical amplifiers would need to be provided and hence it would be expensive.

In order to solve these drawbacks, it is proposed in U.S. Pat. Nos. 5,894,537 and 5,887,105 that the total dispersion of an optical fiber waveguide be managed to a target value by varying the chromatic dispersion from positive to negative and negative to positive at the wavelength of 1.55 µm, alternately along the length of the waveguide.

If such dispersion-managed optical fiber is used for a transmission line, its average wavelength dispersion as a whole would be approximately zero and the deterioration of its transmission quality due to the wavelength dispersion can be restrained. Also, the chromatic dispersion of the transmission line is supposed to be made substantially not to be zero at most of the areas such that the deterioration of the transmission quality due to the four-wave mixing is restrained.

In the above American patent, the manufacturing method of such dispersion-managed optical fiber is also disclosed. According to this method, while an optical fiber preform having a longitudinally uniform refractive index profile is drawn, the diameter of the optical fiber is longitudinally altered so that the wavelength dispersion is adjusted to produce a dispersion-managed optical fiber.

However, because the chromatic dispersion of the optical fiber greatly depends on the core diameter, occasionally it cannot produce the longitudinal distribution of desired values. When the refractive index profile of the optical fiber preform is measured with a preform analyzer to determine the diameter of the optical fiber according to the measurement result, if its measurement precision is not sufficient, the chromatic dispersion of the optical fiber obtained by such drawing often fails to meet the desired value. Therefore, the transmission characteristic of the optical fiber often degrades. This is conspicuous especially in the case of the optical fiber whose effective core area is expanded or whose dispersion slope is reduced.

SUMMARY OF THE INVENTION

The purpose of the present invention, which is accomplished by solving the above-mentioned problem, is to provide the method of precisely manufacturing an optical fiber which has a desired chromatic dispersion.

The manufacturing method of the optical fiber according to the present invention comprises: (1) preparation of an optical fiber preform which has a longitudinally uniform refractive index, (2) measuring the chromatic dispersion of a predetermined length of the optical fiber obtained at the beginning of the drawing, (3) determining, according to the measured chromatic dispersion, the diameter of the optical fiber for each of the sections where the chromatic dispersion is to be positive and where the chromatic dispersion is to be negative, and (4) drawing the remainder of the optical fiber preform according to such determined diameter so as to produce an optical fiber having the alternating sections where the chromatic dispersion of a given wavelength is positive and where the chromatic dispersion of a given wavelength is negative. According to the manufacturing method, an optical fiber which has a desired chromatic dispersion can be precisely manufactured, even if the refractive index profile of the optical fiber preform cannot be precisely measured by the preform analyzer, or the like. Furthermore, the optical fiber thus obtained has excellent transmission characteristics because the waveform distortion due to the chromatic dispersion and the nonlinear optical effect can be restrained.

Another feature of the present invention is that the manufacturing method of the optical fiber enables to maintain a constant drawing tension by controlling the drawing speed or the temperature of the fused portion of the optical fiber preform for the remainder of the optical fiber preform. In this case, an optical fiber that has a desired chromatic dispersion characteristic can be precisely manufactured because the refractive index change caused by the residual stress does not vary longitudinally, and hence the change of the chromatic dispersion is caused only by the change of the diameter, i.e., the core diameter, of the optical fiber.

The above and further objects and novel features of the invention will be more fully clarified from the following detailed description when the same is read in connection with the accompanying drawing. It is to be expressly understood, however, that the drawing is for the purpose of illustration only and is not intended as a definition of the limits of the invention.

BRIEF DESCRIPTION OF THE DRAWING

In order to more fully understand the drawings used in the detailed description of the present invention, a brief description of each drawing is provided.

DESCRIPTION OF THE PREFERRED EMBODIMENT

Figure 1:
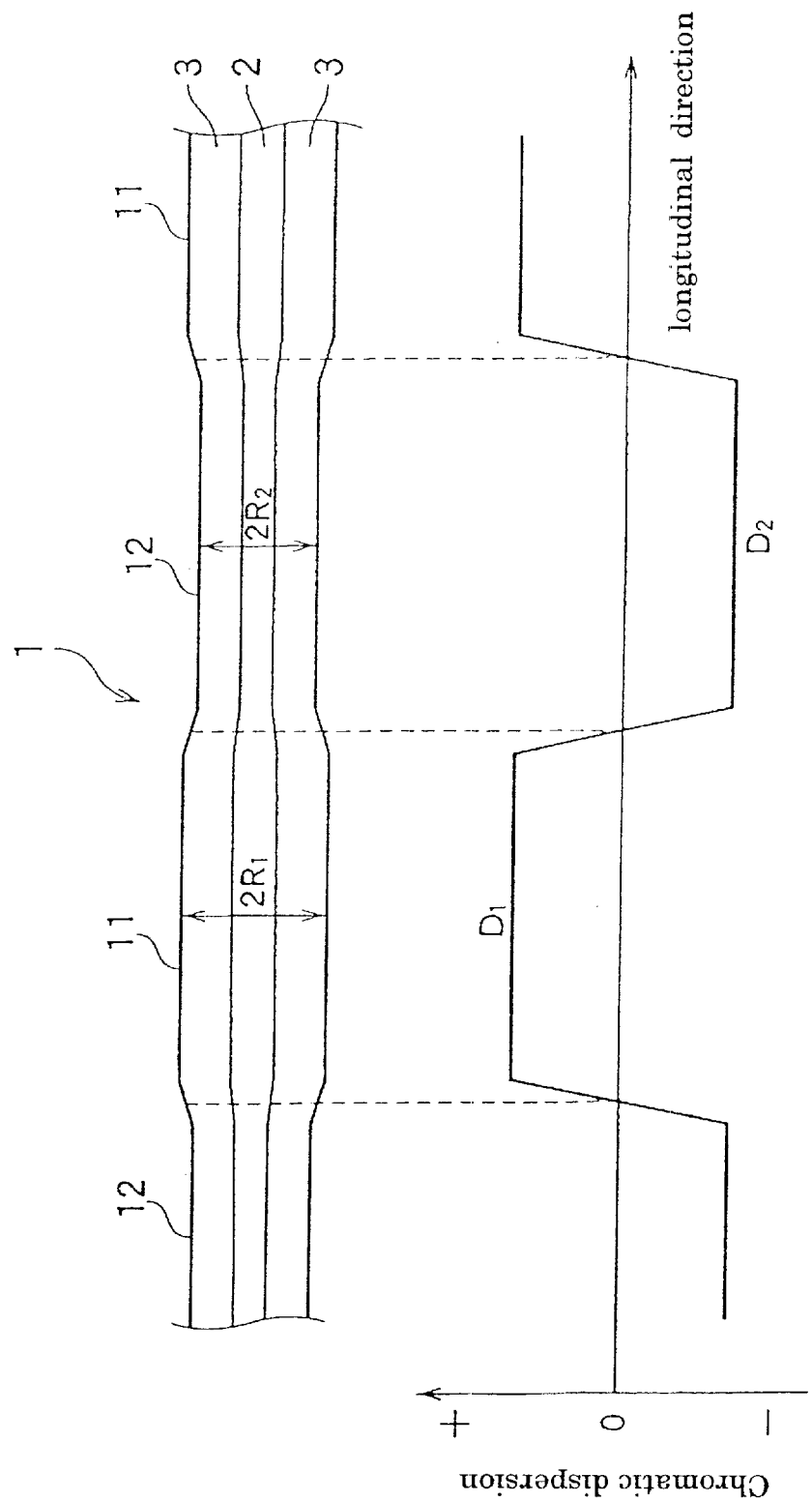
FIG. 1 is a diagram of an optical fiber manufactured by the manufacturing method according to the present embodiment.

In the following, preferred embodiments of the present invention will be explained in detail with reference to the accompanying drawings. To facilitate the comprehension of the explanation, the same reference numerals denotes the same parts, where possible, throughout the drawings, and a repeated explanation will be omitted. The dimensions in the drawing are partly exaggerated and do not always correspond to actual ratios of dimensions.

First, the optical fiber 1 manufactured by the manufacturing method of the optical fiber according to the present embodiment is explained with reference to FIG. 1. In this optical fiber 1, positive dispersion sections 11 having positive chromatic dispersion $D_1$ at a given wavelength (e.g., 1.55 μm wavelength) and negative dispersion sections 12 having negative chromatic dispersion $D_2$ are alternately provided. This optical fiber 1 is obtained by drawing an optical fiber preform having a longitudinally uniform refractive index profile, and during such drawing, the diameter of the optical fiber is adjusted so as to have the positive dispersion sections 11 having diameter $2R_1$ and the negative dispersion sections 12 having diameter $2R_2$. Thus, between the positive dispersion sections 11 and the negative dispersion sections 12, there is a difference in the outer diameter of core region 2 in proportion to the diameter of the optical fiber (namely, the outer diameter of cladding region 3) and hence there is a difference with respect to the chromatic dispersion as well.

Figure 2:
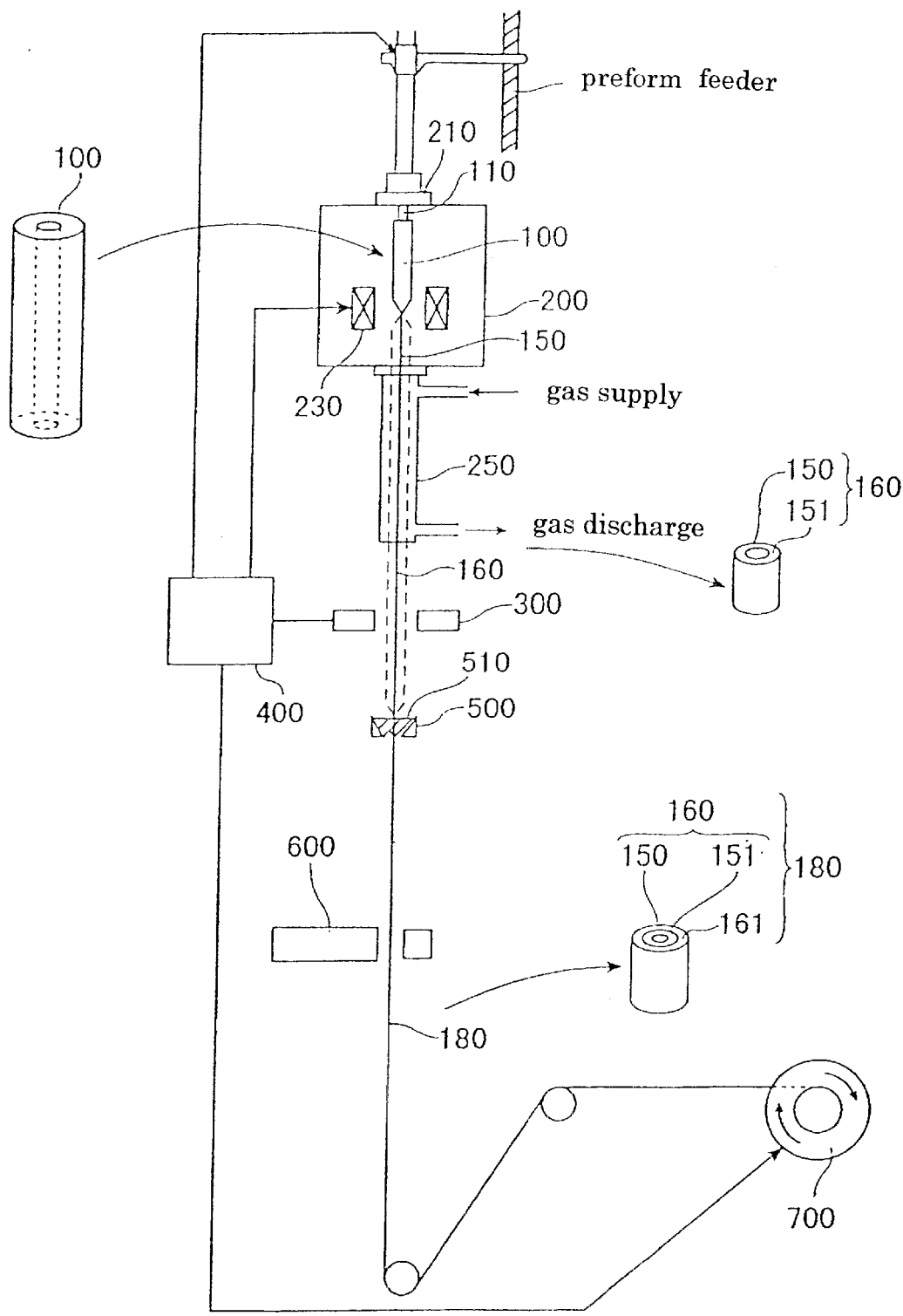
FIG. 2 is a process diagram of the manufacturing method of the optical fiber.

Next, the manufacturing method of the optical fiber is explained with reference to the manufacturing process shown in FIG. 2. First, an optical fiber preform 100 is prepared. This optical fiber preform 100, which contains silica glass as its main component and has a predetermined refractive index profile, is produced by the Vapor phase Axial Deposition (VAD) method, the Outside Vapor phase Deposition (OVD) method, the Modified Chemical Vapor Deposition (MCVD) method or Rod-in-tube method and so on. This optical fiber preform 100 has also longitudinally uniform additive concentration, and hence its refractive index profile in the cross-section perpendicular to the axis is also longitudinally uniform.

This optical fiber preform 100 is fixed to a chuck 210 through a dummy rod 110 and is set in a drawing furnace 200. Then, the bottom end of the optical fiber preform 100 is heated with a heater 230, and an optical fiber 150 is thus drawn from the fused bottom end portion.

The outer diameter of a drawn optical fiber 160 is measured by a laser outer diameter measuring instrument 300. Moreover, the result of such diameter measurement is reported to a drawing control unit 400, and with this drawing control unit 400, the drawing speed and the temperature of the fused portion are controlled according to the measurement result so that the outer diameter of optical fiber 160 meets the pre-determined values (the values are different depending on whether it is to be a positive dispersion section or a negative dispersion section).

The optical fiber 160 which has passed through the laser outer diameter measuring instrument 300 passes through a liquid resin 510 filled in a resin coating die 500. As the optical fiber 160 passes through the resin 510, the resin adheres to its surface. This resin is hardened by ultraviolet light from UV lamp 600 and an optical fiber 180 having a resin film 161 is thus formed. Then, the optical fiber 180 is rolled up onto a drum 700.

The drawn optical fiber 150 may also go through a reaction pipe 250 for forming a carbon film thereon. A mixed gas of halocarbon ($CHCl_3$, $CCl_4$, etc.) and hydrocarbon ($C_2H_4$, $C_3H_8$, $C_6H_6$, etc.) is supplied into the inside of the reaction pipe 25, and this mixed gas reacts on the surface of the optical fiber 150 and the hermetic coating consisting of a carbon film 151 is formed on the surface of the optical fiber 150.

The manufacturing method of the optical fiber according to the present embodiment enables to manufacture the optical fiber 150 (the optical fiber 1 in FIG. 1) in which a positive dispersion section and a negative dispersion section are alternately provided for, by (1) measuring the chromatic dispersion of the optical fiber 150 at a predetermined length produced at the beginning of drawing of the optical fiber preform 100 in such manufacturing process, (2) determining the diameter of the optical fiber according to this chromatic dispersion so as to achieve the target chromatic dispersion in each of the positive dispersion section and the negative dispersion section, and (3) drawing the remainder of the optical fiber preform 100 according to the diameter thus determined.

Figure 3:
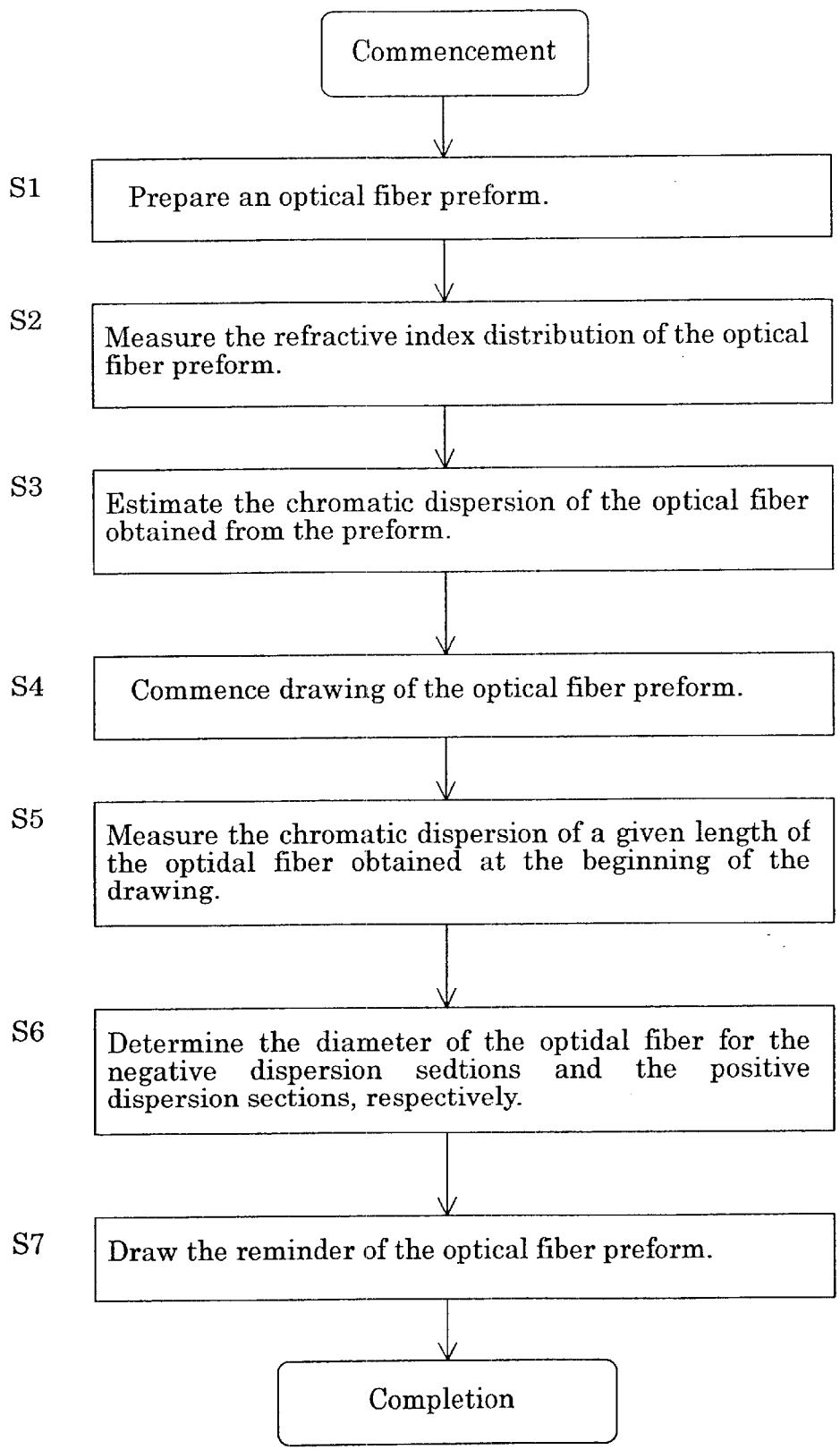
FIG. 3 is a flow chart explaining the manufacturing method of the optical fiber according to the present embodiment.

In the following, the manufacturing method of an optical fiber according to the present embodiment is explained in detail using the flow chart shown in FIG. 3. First, an optical fiber preform 100 having a longitudinally uniform refractive index profile is prepared (Step S1). Then, the refractive index distribution of this optical fiber preform 100 is measured with a preform analyzer (Step S2). The chromatic dispersion characteristics (the wavelength dependence and the diameter dependence of the optical fiber) of the optical fiber 150 drawn from the optical fiber preform 100 is estimated according to the results of such measurement (Step S3). Then, the optical fiber preform 100 is set in a drawing furnace 200, and the bottom end of the optical fiber preform 100 is fused with a heater 230 and the optical fiber preform 100 begins to be drawn (Step S4).

Then, at the beginning of the drawing, the diameter and the chromatic dispersion of the optical fiber 150 of a given length (e.g., about 1 km–5 km) drawn from the optical fiber preform 100 are measured (Step S5). The measurement of the chromatic dispersion may be conducted with an optical fiber 150 of a predetermined length cut out or rolled up onto a drum 700. Furthermore, according to these measured chromatic dispersions and the diameter of the optical fiber, the diameter $2R_1$ of the optical fiber is determined so as to realize the target chromatic dispersion $D_1$ in the positive dispersion sections 11, and the diameter $2R_2$ of the optical fiber is also determined to realize the target chromatic dispersion $D_2$ in the negative dispersion sections 12 (Step S6). The determination of each of the diameters $2R_1$, $2R_2$ of the optical fiber is made by correcting, according to the results of measurement made in Step S5, the chromatic dispersion characteristics of the optical fiber 150 which were estimated in Step S3. It is also preferable to determine each length of the positive dispersion section and the negative dispersion section at the time when the diameters $2R_1$, $2R_2$ of the optical fiber are determined. While conducting these Steps S5 and S6, it is preferable to set a low drawing speed from the viewpoint of yield.

Then, drawing the remainder of the optical fiber preform 100 produces the optical fiber 150 (the optical fiber 1 in the case of FIG. 1) in which a positive dispersion section 11 having the diameter $2R_1$ of the optical fiber and a negative dispersion section 12 having the diameter $2R_2$ of the optical fiber are alternately provided for (Step S7). Adjustment should be made to provide an appropriate length in each of the positive dispersion sections 11 and negative dispersion sections 12. It is possible to adjust the diameter of the optical fiber by controlling the feeding speed of optical fiber preform 100 and the drawing speed of the optical fiber 150. It is also possible to adjust the diameter of the optical fiber by controlling the quantity of electric power supplied to the heater 230 or the kind of gas supplied into the drawing furnace 200 and adjusting the temperature of the fused bottom end portion of the optical fiber preform 100.

Thus, by adjusting the drawing speed or the temperature of the fused portion while the drawing tension is maintained in constant, the stress remaining in the optical fiber 1 can be made longitudinally uniform and hence it is possible to prevent residual stress from causing the refractive index variation. Thus, if the residual stress does not change longitudinally, the variation of the chromatic dispersion is caused solely by the variation in the diameter, i.e. the core diameter of the optical fiber, and hence the optical fiber having a desired chromatic dispersion can be precisely manufactured.

Figure 4:
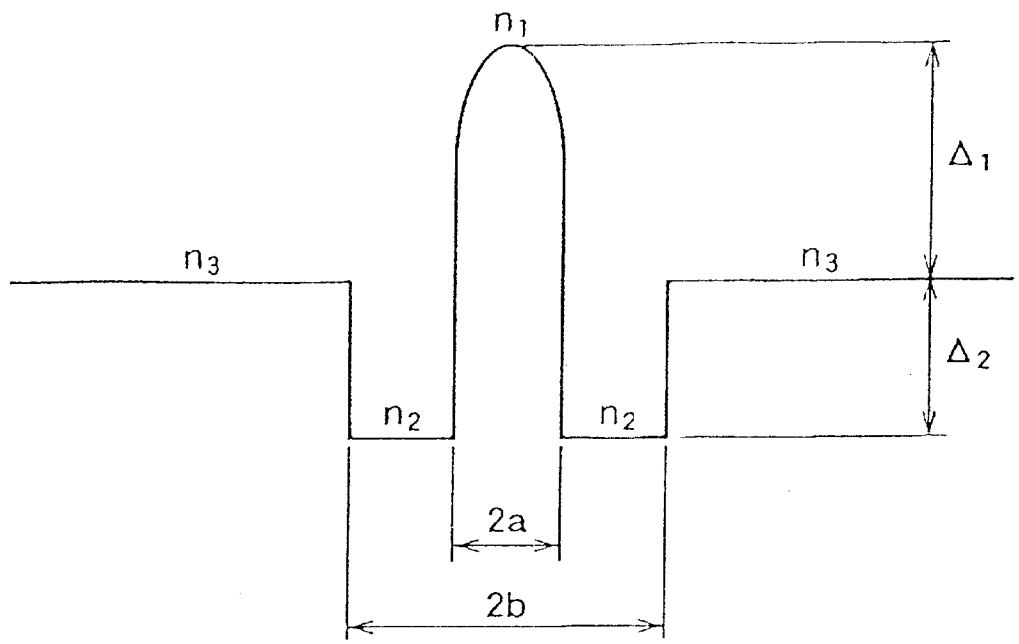
FIG. 4 is an example of the refractive index profile of an optical fiber manufactured by the manufacturing method of the optical fiber according to the present embodiment.
Figure 5:
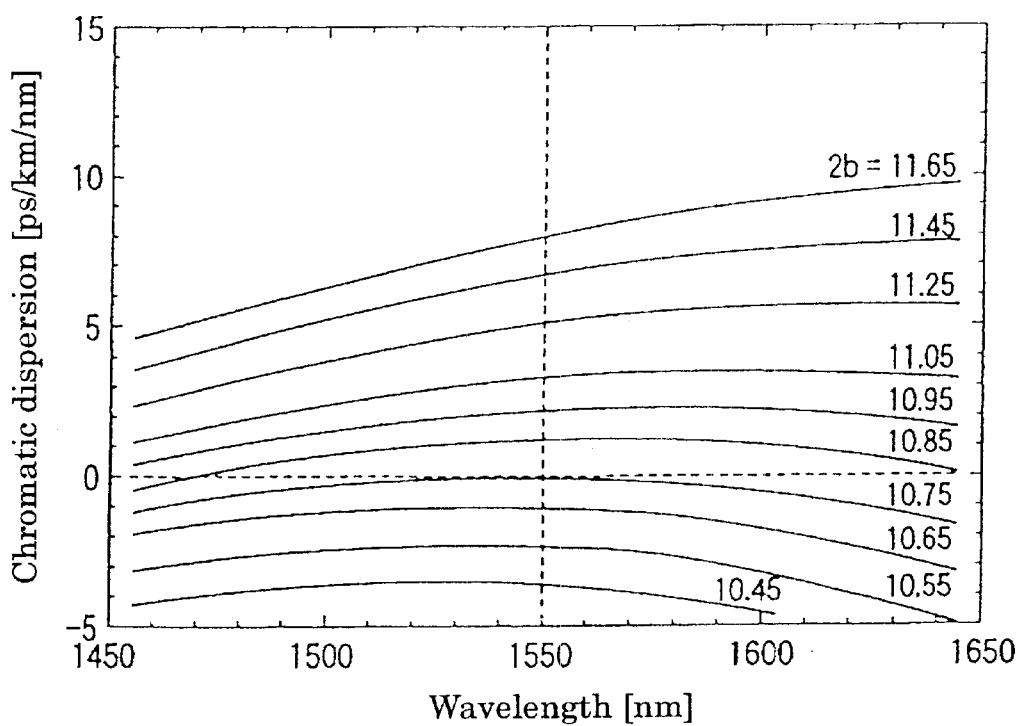
FIG. 5 is a graph showing the chromatic dispersion characteristic of the optical fiber having the refractive index profile shown in FIG. 4.

Next, the method of determining the diameter of the optical fiber in the above Step S6 is explained in detail. FIG. 4 is an example of the refractive index profile of the optical fiber manufactured by the manufacturing method of the optical fiber according to the present embodiment. FIG. 5 is a graph showing the chromatic dispersion characteristic of the optical fiber having the refractive index profile shown in FIG. 4. This optical fiber comprises, in order from the center, the core region having outer diameter $2a$ and the maximum refractive index $n_1$, the depressed region having outer diameter $2b$ and the refractive index $n_2$, and the clad region having the refractive index $n_3$, and the size relation of each refractive index is $n_1>n_3>n_2$. Such a refractive index profile can be realized by using silica glass as a base material and adding, for example, $GeO_2$ to the core region and fluorine to the depressed region.

The graph shown in FIG. 5 shows the wavelength dependence of the chromatic dispersion to each value (10.45 $\mu$m–11.65 $\mu$m) of the outer diameter $2b$ of the depressed region. Here, on the basis of the refractive index of the clad region, the relative refractive index difference $\Delta_1$ of the core region was 0.9% and the relative refractive index difference $\Delta_1$ of the depressed region was 0.45%, and the ratio ($2a/2b$) of the respective outer diameters of the core regions and the depressed regions was 0.58. As shown in FIG. 5, the greater the outer diameter $2b$ of the depressed region, that is, the greater the outer diameter $2a$ of the core region, the greater the chromatic dispersion at the 1.55 $\mu$m wavelength.

Figure 6:
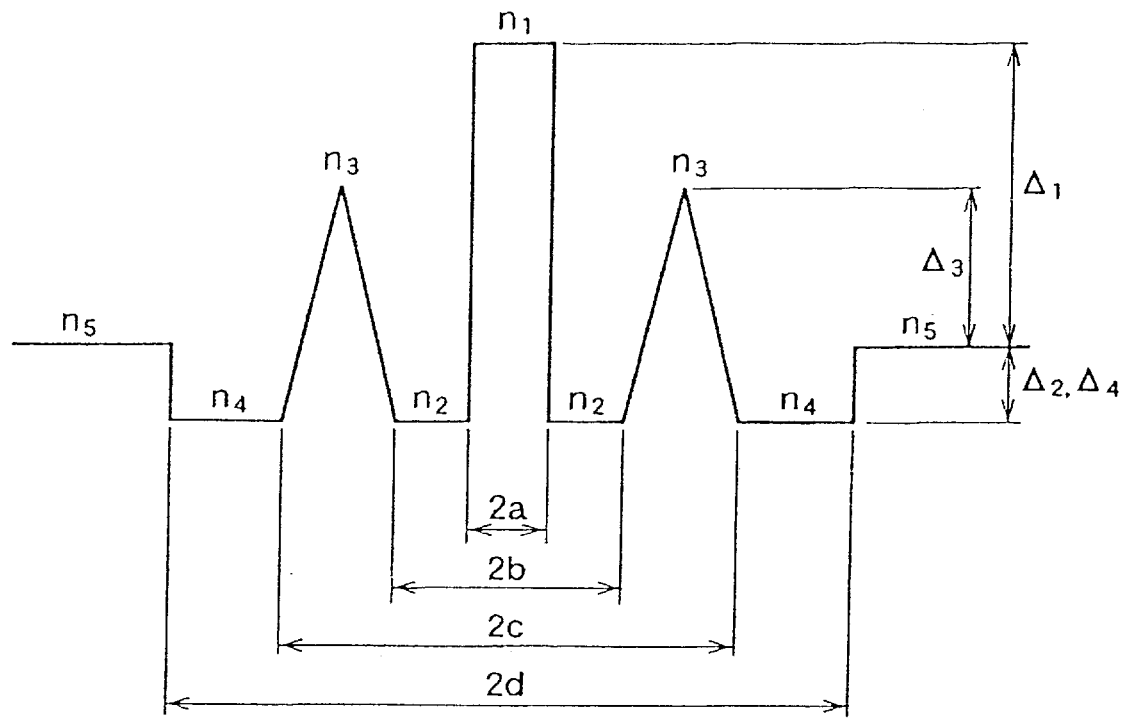
FIG. 6 is an example of the refractive index profile of the optical fiber manufactured by the manufacturing method of the optical fiber according to the present embodiment.
Figure 7:
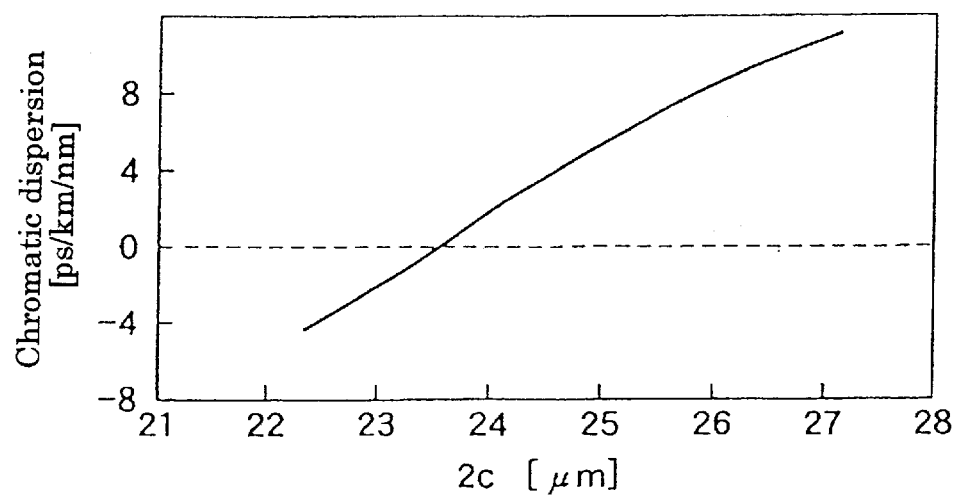
FIG. 7 is a graph showing the chromatic dispersion characteristic of the optical fiber having the refractive index profile shown in FIG. 6.

FIG. 6 is another example of the refractive index profile of the optical fiber manufactured by the manufacturing method of the optical fiber according to the present embodiment. FIG. 7 is a graph showing the chromatic dispersion characteristic of the optical fiber having the refractive index profile shown in FIG. 6. This optical fiber comprises, in order from the center, the 1st core region having the outer diameter $2a$ and the maximum refractive index $n_1$, the 2nd core region having the outer diameter $2a$ and the refractive index $n_2$, the 3rd core region having the outer diameter $2c$ and the maximum refractive index $n_2$, the depressed region having the outer diameter $2d$ and the refractive index $n_4$, and the clad region having the refractive index $n_5$. The size relation of each refractive index is $n_1>n_3>n_5>n_2$, $n_4$. Such a refractive index profile can be realized by using silica glass as a base material and adding, for example, $GeO_2$ to the 1st core region and the 3rd core region, and fluorine to the 2nd core region and the depressed region.

The graph in FIG. 7 shows the relation between the chromatic dispersion at the 1.55 $\mu$m wavelength and the outer diameter $2c$ of the 3rd core region. Here, on the basis of the refractive index of the clad region, the relative refractive index difference $\Delta_1$ of the 1st core region was 0.61%, the relative refractive index difference $\Delta_2$ of the 2nd core region was –0.05%, the relative refractive index difference $\Delta_3$ of the 3rd core region was 0.35%, and the relative refractive index difference $\Delta_4$ of the depressed region was –0.05%. The ratio ($2a/2b$) of the respective outer diameters of the 1st core region and the 2nd region was 0.22, the ratio ($2b/2c$) of the respective outer diameters of the 2nd core region and the 3rd core region was 0.54, and the ratio ($2c/2d$) of the respective outer diameters of the 3rd core region and the depressed regions was 0.54. As shown in this figure, the greater the outer diameter $2c$ of the 3rd core region, the greater the chromatic dispersion of the 1.55 $\mu$m wavelength.

Thus, the chromatic dispersion depends on the core diameter. In Step S6, therefore, the chromatic dispersion, which was estimated in Step S3, of the optical fiber and the chromatic dispersion, which was measured in Step S5, of the optical fiber are compared with each other, and based on the result of such comparison, the diameter is adjusted. Then, the diameter $2R_1$ of the optical fiber is determined so as to achieve the target chromatic dispersion $D_1$ of positive dispersion sections 11, and the diameter $2R_2$ of the optical fiber is also determined so as to realize the target chromatic dispersion $D_2$ of the negative dispersion sections 12.

As described above, according to the manufacturing method of the optical fiber relating to the present embodiment, the optical fiber comprising positive dispersion sections and negative dispersion sections, which are alternately provided longitudinally, can be manufactured by (1) preparing an optical fiber preform having a longitudinally uniform refractive index profile, (2) measuring the chromatic dispersion of a pre-determined length of fiber obtained at the beginning of the drawing of the optical fiber preform, (3) determining the diameter of the optical fiber to achieve the respective target chromatic dispersion in each of the positive dispersion sections and the negative dispersion sections according to such measured chromatic dispersion, (4) drawing the remainder of the optical fiber preform according to the diameter thus determined of the optical fiber.

Thus, even if the precision of measuring the refractive index profile of the optical fiber preform by the preform analyzer is insufficient, and even when manufacturing an optical fiber having an expanded effective core area or an optical fiber having a reduced dispersion slope, the optical fiber having a desired chromatic dispersion can be precisely manufactured. Moreover, the optical fiber thus obtained has excellent transmission characteristics: waveform deterioration due to chromatic dispersion and the nonlinear optical effect can be restrained.

If the diameter of the optical fiber is less than 100 μm, it would be prone to break because of the tensile stress during the cable manufacturing process and hence its handling will be difficult. Therefore, it is preferable that the diameter of the optical fiber be equal to or more than 100 μm in both the positive dispersion sections 11 and the negative dispersion sections 12. If the diameter of the optical fiber exceeds 150 μm, the tensile stress in the surface of the optical fiber becomes strong when a bend distortion is given to it and hence its fatigue lifetime is shortened. Therefore, it is preferable that the diameter of the optical fiber is equal to or less than 150 μm in both of the positive dispersion sections 11 and the negative dispersion sections 12.

The present invention is not limited to the above embodiments and various modifications are possible without departing from the spirit and scope of the invention. For example, in the above embodiments, the chromatic dispersion in each positive dispersion section 11 is an identical value $D_1$, and the chromatic dispersion in each negative dispersion section 12 is an identical value $D_2$, but each of the positive dispersion sections 11 may have a different chromatic dispersion, and each of the negative dispersion sections 12 may have a different chromatic dispersion. The present invention can also be applied such a case, and the desired chromatic dispersion characteristic in each section can be made.

What is claimed is:

1. A manufacturing method of an optical fiber comprising positive dispersion sections where the chromatic dispersion is positive at a given wavelength and negative dispersion sections where the chromatic dispersion is negative at a given wavelength, said positive dispersion sections and said negative dispersion sections are longitudinally alternately provided, said manufacturing method comprising:

preparing an optical fiber preform having a longitudinally uniform refractive index profile, measuring the chromatic dispersion of a pre-determined length of an optical fiber obtained at the beginning of the drawing of said optical fiber preform, determining the respective diameters of the optical fiber, according to the measured chromatic dispersion, for each of the sections where the chromatic dispersion is to be positive and where the chromatic dispersion is to be negative, and drawing the remainder of said optical fiber preform according to each said diameter.

2. A manufacturing method of the optical fiber according to claim 1, wherein the drawing speed or the temperature of the fused portion of said optical fiber preform is controlled, while a constant drawing tension is maintained during the drawing of said remainder of said optical fiber preform.

* * * * *